United States Patent
Huang et al.

(10) Patent No.: US 7,483,217 B2
(45) Date of Patent: Jan. 27, 2009

(54) AXIALLY SYMMETRICAL MOLDED GLASS LENS, MOLD ASSEMBLY FOR AN AXIALLY SYMMETRICAL MOLDED GLASS LENS, METHOD FOR MANUFACTURING A MOLD ASSEMBLY FOR AN AXIALLY SYMMETRICAL MOLDED GLASS LENS AND METHOD FOR MANUFACTURING AN AXIALLY SYMMETRICAL MOLDED GLASS LENS

(75) Inventors: Jen-Sheuan Huang, Hsinchu (TW); Ching-Hung Chen, Taoyuan Hsien (TW); Kuan-Hung Lin, Taipei Hsien (TW); Wen-Jen Liao, Taipei Hsien (TW); Wen-Yu Liang, Taoyuan Hsien (TW); Shih-Wei Yeh, Taoyuan Hsien (TW); Wen-Chin Ting, Taipei Hsien (TW)

(73) Assignee: Kinik Company, Taipei (TW)

( * ) Notice: Subject to any disclaimer, the term of this patent is extended or adjusted under 35 U.S.C. 154(b) by 0 days.

(21) Appl. No.: 11/604,469

(22) Filed: Nov. 27, 2006

(65) Prior Publication Data

US 2007/0119212 A1    May 31, 2007

(30) Foreign Application Priority Data

Nov. 29, 2005 (TW) ............................. 94141800 A
Jul. 5, 2006 (TW) ............................. 95124463 A

(51) Int. Cl.
*G02B 3/00* (2006.01)
*G02B 7/02* (2006.01)

(52) U.S. Cl. ..................................... 359/642; 359/811
(58) Field of Classification Search ................. 359/642, 359/702, 795, 811; 65/101, 64, 47
See application file for complete search history.

(56) References Cited

U.S. PATENT DOCUMENTS

| 5,188,650 A * | 2/1993 | Nomura ........................ 65/64 |
| 5,246,198 A * | 9/1993 | Kurihara .................. 249/114.1 |
| 2006/0198034 A1* | 9/2006 | Shikano et al. ............. 359/811 |

FOREIGN PATENT DOCUMENTS

| JP | 1188437 | 7/1989 |
| JP | H01-188437 | 7/1989 |
| JP | 2000-249812 | 9/2000 |
| JP | 2000249812 | 9/2000 |

* cited by examiner

*Primary Examiner*—Mohammed Hasan
(74) *Attorney, Agent, or Firm*—Alan Kamrath; Kamrath & Associates PA

(57) ABSTRACT

An axially symmetrical molded glass lens has a central longitudinal axis, a lens surface, an annular intermediate area and a mounting flange area. The lens surface is axially symmetric around the central longitudinal axis and is curved. The annular intermediate area is curved and axially symmetric, is formed around the lens surface and has a radius of curvature having a continuously vary modulus that decreases as the radius of curvature approaches the annular intermediate area. The mounting flange area is formed around and connects smoothly to the annular intermediate area. The axially symmetrical molded glass lens has fine precision, a high production rate and a low cost.

12 Claims, 9 Drawing Sheets

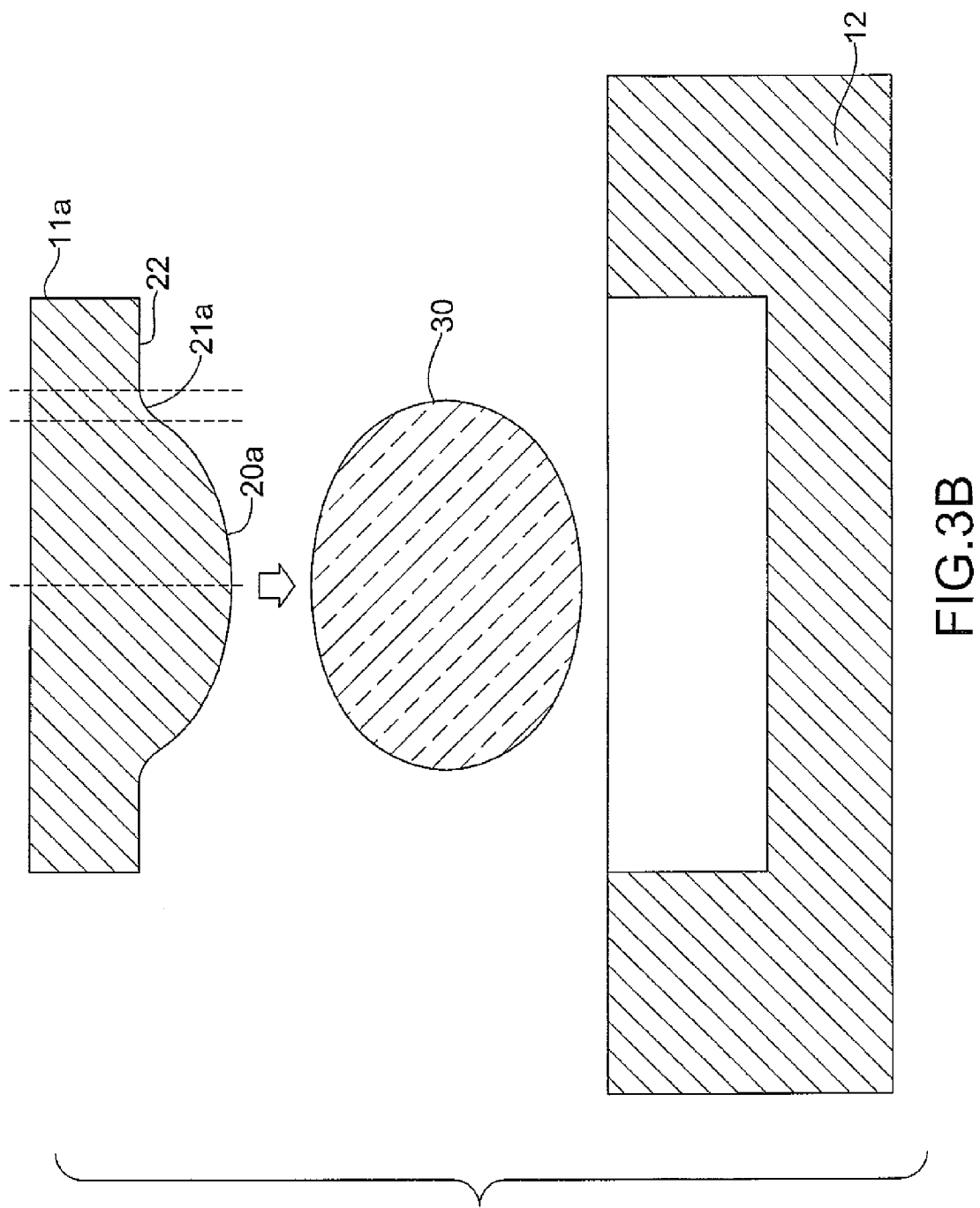

AXIALLY SYMMETRICAL MOLDED GLASS LENS, MOLD ASSEMBLY FOR AN AXIALLY SYMMETRICAL MOLDED GLASS LENS, METHOD FOR MANUFACTURING A MOLD ASSEMBLY FOR AN AXIALLY SYMMETRICAL MOLDED GLASS LENS AND METHOD FOR MANUFACTURING AN AXIALLY SYMMETRICAL MOLDED GLASS LENS

BACKGROUND OF THE INVENTION

1. Field of the Invention

The present invention relates to a molded glass lens, a mold assembly, a method for manufacturing a mold assembly and a method for manufacturing a molded glass lens, and more particularly to an axially symmetrical molded glass lens, a mold assembly for an axially symmetrical molded glass lens, a method for manufacturing a mold assembly for an axially symmetrical molded glass lens and a method for manufacturing an axially symmetrical molded glass lens.

2. Description of Related Art

Lenses are core elements of optical devices such as microscopes, magnifier telescopes, digital cameras and video cameras, are manufactured in a mold with lens surfaces cut with a computer numerical control (CNC) grinding machine and are high precision.

With reference to FIG. 1, most conventional hot-press molded lenses (110) provide clear and sharp images, are made of glass and are circular, and each hot-press molded lens (110) has a central, axially symmetrical lens, a mounting flange and an annular intermediate area. In telescopes and microscopes with the primary function of magnifying images, the lens quality greatly affects the precision of the magnifying power and focal length.

The mounting flange is formed on and protrudes radially out from the axially symmetrical lens, is used to mount the hot-press molded lens (110) in an optical device and has a flat upper surface and a flat lower surface. The flat upper surface has an inner edge. The flat lower surface has an inner edge and is parallel to the flat upper surface.

The annular intermediate area is formed of the flat upper and lower surfaces respectively and may be a sharp edge and often has optical discontinuities. The discontinuities cause aberrations that adversely affect images at or near the edge of the axially symmetrical lens.

A conventional mold for manufacturing a hot-press molded lens (110) comprises two molds (100). The molds (100) mate with each other to form an internal cavity in which a hot-press molded lens (110) is pressed. Each mold (100) has an intermediate area, an axially symmetrical lens transferring area (101) and a flat area (102).

The axially symmetrical lens transferring area (101) is formed in or on the flat surface of one mold (100), may correspond to an axially symmetrical lens transferring area (101) in or on the inner surface of the matching mold (100) and has a sharp edge (103). The sharp edge (103) is formed around the axial lens transferring area (101) at the inner surface.

A conventional method of manufacturing the mold for a glass lens comprises lathing or grinding a piece of mold with a lathe cutting tool or a grinding tool. The axially symmetrical lens transferring area (101) is circular and axially symmetric, is formed in or on the inner surface of the mold and forms an outer surface on the glass to form the molded glass lens when the molten glass is in the mold.

A conventional lathing or grinding process to form a mold for a glass lens from a piece of mold is implemented with a computer numerical control (CNC) lathe or grinder. The CNC lathe or grinder rotates a piece of mold, cuts a desired shape in the piece of mold and has a cutting tool or grinding tool and a computer. The computer controls the cutting tool or grinding tool to cut a specific shape in the piece of mold and has a cutting-path formula as follows.

$$Z = \frac{CY^2}{1 + \sqrt{1-(1+K)C^2Y^2}} + A_2 Y^2 + A_4 Y^4 + \ldots + A_{2n} Y^{2n}$$

wherein "Z" is a vertical coordinate, "Y" is a horizontal coordinate and "$A_2$," "$A_4$," "$A_{2n}$," "C" and "K" are constants that can be adjusted.

However, the axially symmetrical lens transferring area (101) connects to the flat area (102) on the mold (100) and forms the sharp edge (103) between the axially symmetrical lens transferring area (101) and the flat area (102). Molten glass material is poured into the mold between the flat area (102) and the axially symmetrical lens transferring area (101). However, the molten glass rubs against and breaks the sharp edge (103) when passing through the sharp edge (103), which decreases quality, precision and production rate of the axially symmetrical lens.

Japan patent No. 1188437 discloses a mold for manufacturing a molded glass lens, which has an axially symmetrical lens transferring area, a flat area and an intermediate area. The intermediate area is formed on the mold between the axially symmetrical lens transferring area and the flat area, is annular and curved and has a constant radius of curvature preferably larger than 0.2 millimeter. When a glass lens is molded, molten glass flows smoothly over the intermediate area without causing aberrations in the glass or damaging the mold. The resultant glass lens has no undesired discontinuities because no sharp edge exists on or between the axially symmetrical lens transferring area and the flat area on the mold (100).

However, a method for manufacturing the mold described in the Japan patent comprises two distinct cutting steps instead of one. The cutting steps respectively cut the axially symmetrical lens transferring area (101) and an intermediate area in the mold (100). Furthermore, the steps are implemented with two different cutting-path formulas corresponding respectively to the axially symmetrical lens transferring area and intermediate area. However, two cutting-path corrections cannot be made simultaneously to the two different cutting-path formulas in CNC lathe machines currently available. Therefore, manufacturers must change the cutting-path formulas for each mold (100) or sequentially cut multiple molds (100) with one cutting-path formula. Therefore, the mold has a low production rate, and the mold quality is questionable, at best.

Japan patent publication No. 2000-249812 discloses an optical glass lens, a mold and a method for manufacturing the mold. The mold has an axially symmetrical lens transferring area, a flat area and an intermediate area. The intermediate area is between the axially symmetrical lens transferring area and flat area and is curved. However, the method for manufacturing the mold also has two steps respectively with different cutting-path formulas applicable respectively to the axially symmetrical lens transferring area (101) and the intermediate area. The transferring area and intermediate area still have to be corrected sequentially. Therefore, the mold still has insufficient precision and a low production rate.

A conventional method for manufacturing a glass lens is to put glass into a mold to form the glass lens.

To overcome the shortcomings, the present invention provides an axially symmetrical molded glass lens, a mold assembly for an axially symmetrical molded glass lens, a method for manufacturing a mold assembly for an axially symmetrical molded glass lens and a method for manufacturing an axially symmetrical molded glass lens to mitigate or obviate the aforementioned problems.

SUMMARY OF THE INVENTION

The main objective of the invention is to provide an axially symmetrical molded glass lens having fine precision, a high production rate and low cost.

A mold assembly for manufacturing axially symmetrical molded glass lens comprises an upper mold and a lower mold. At least one of the profiles of the upper and lower molds has an annular, axially symmetrical flat area; a circular, axially symmetrical lens transferring area; and an annular, axially symmetrical intermediate area, extended from the lens transferring area and being a part of the lens transferring area connecting smoothly and continuously the lens transferring area and the flat area, and having a radius of curvature. Values of the radius of curvature vary continuously to meet the requirements to smoothly and continuously connect the lens transferring area and the flat area.

The mold assembly improves the production rate of axially symmetrical molded glass lenses.

At least one of the lens transferring area of the upper or lower molds has a shape selected from a convex shape, a concave shape, a flat shape or a hybrid shape from a macro aspect. The intermediate area could be convex shaped, concave shaped, flat shaped or hybrid shaped according to the requirements to smoothly and continuously connect the lens transferring area and the flat area. An angle between the flat area and a plane tangent to the intermediate area is less than 45° and approaches to 0° as the plane moves from the lens transferring area toward the flat area.

The upper and lower molds are made of material from a group of carbide, nitride and silicon sinter. It could have one or more protective coatings deposited on the lens transferring area. The materials of the protective coatings are selected from a group comprising gold, platinum, iridium, osmium, rhenium, silver, palladium, rhodium, ruthenium, technetium, and their alloys or ceramics thereof, diamond-like carbon and diamond.

A method for manufacturing a mold assembly for an axially symmetrical molded glass lens comprises cutting at least one mold to form an area of the mold. It comprises an upper mold and a lower mold. At least one of the profiles of the upper and lower molds has an annular, axially symmetrical flat area; a circular, axially symmetrical lens transferring area; and an annular, axially symmetrical intermediate area, with the intermediate area extended from the lens transferring area and being a part of the lens transferring area, connecting smoothly and continuously the lens transferring area and the flat area, and having a radius of curvature. Values of the radius of curvature vary continuously to meet the requirements to smoothly and continuously connect the lens transferring area and the flat area. An angle between the flat area and the plane tangent to the intermediate area approaches to 0° as the plane moves from the lens transferring area toward the flat area.

An axially symmetrical molded glass lens comprising a central longitudinal axis; a lens surface; an annular, axially symmetrical intermediate area, and a mounting flange area. The lens surface is circular and axially symmetric around the central longitudinal axis and is curved from lens center toward the intermediate area. The annular, axially symmetrical intermediate area is extended from the lens surface and being a part of the lens surface and connecting smoothly and continuously the lens surface and the mounting flange area. The mounting flange area is flat and formed around and connecting smoothly and continuously with the annular intermediate area. Values of the radius of curvature vary continuously to meet the requirements to smoothly and continuously connect the lens surface and the mounting flange area. An angle between the mounting flange area and the plane tangent to the intermediate area approaches to 0° as the plane moves from the lens surface toward the mounting flange area.

At least one optical coating is formed on the lens selected to perform as an ultraviolet filter, an infrared filter, a visible light attenuator, and a light efficiency improving coating or a combination thereof.

A method for manufacturing an axially symmetrical molded glass lens includes hot-pressing glass by a mold assembly to form an axially symmetrical molded glass lens. The mold assembly has an upper mold and a lower mold. At least one of profiles of the upper and lower molds has an annular, axially symmetrical flat area, a circular, axially symmetrical lens transferring area, and an annular, axially symmetrical intermediate area extended from the lens transferring area and being a part of the lens transferring area, and connecting smoothly and continuously the lens transferring area and the flat area.

The flat area, the lens transferring area and the intermediate area of the mold assembly are transferred to the glass respectively to form the mounting flange area, the lens surface and the annular intermediate area on the axially symmetrical molded glass lens. Values of the radius of curvature of the annular intermediate area vary continuously to meet the requirements to smoothly and continuously connect the lens surface and the mounting flange area. An angle between the mounting flange area and the plane tangent to the intermediate area approaches to 0° as the plane moves from the lens surface toward the mounting flange area.

Other objectives, advantages and novel features of the invention will become more apparent from the following detailed description when taken in conjunction with the accompanying drawings.

BRIEF DESCRIPTION OF THE DRAWINGS

FIG. 3B is an operational cross sectional side view of a second embodiment of a mold assembly in accordance with the present invention used to form an axial symmetrical molded glass lens;

DETAILED DESCRIPTION OF THE PREFERRED EMBODIMENT

An axially symmetrical molded glass lens, a mold assembly for an axially symmetrical molded glass lens, a method for manufacturing a mold assembly for an axially symmetrical molded glass lens and a method for manufacturing an axially symmetrical molded glass lens in accordance with the present invention improve precision and reduce cost of the axially symmetrical molded glass lens.

Figure 1:
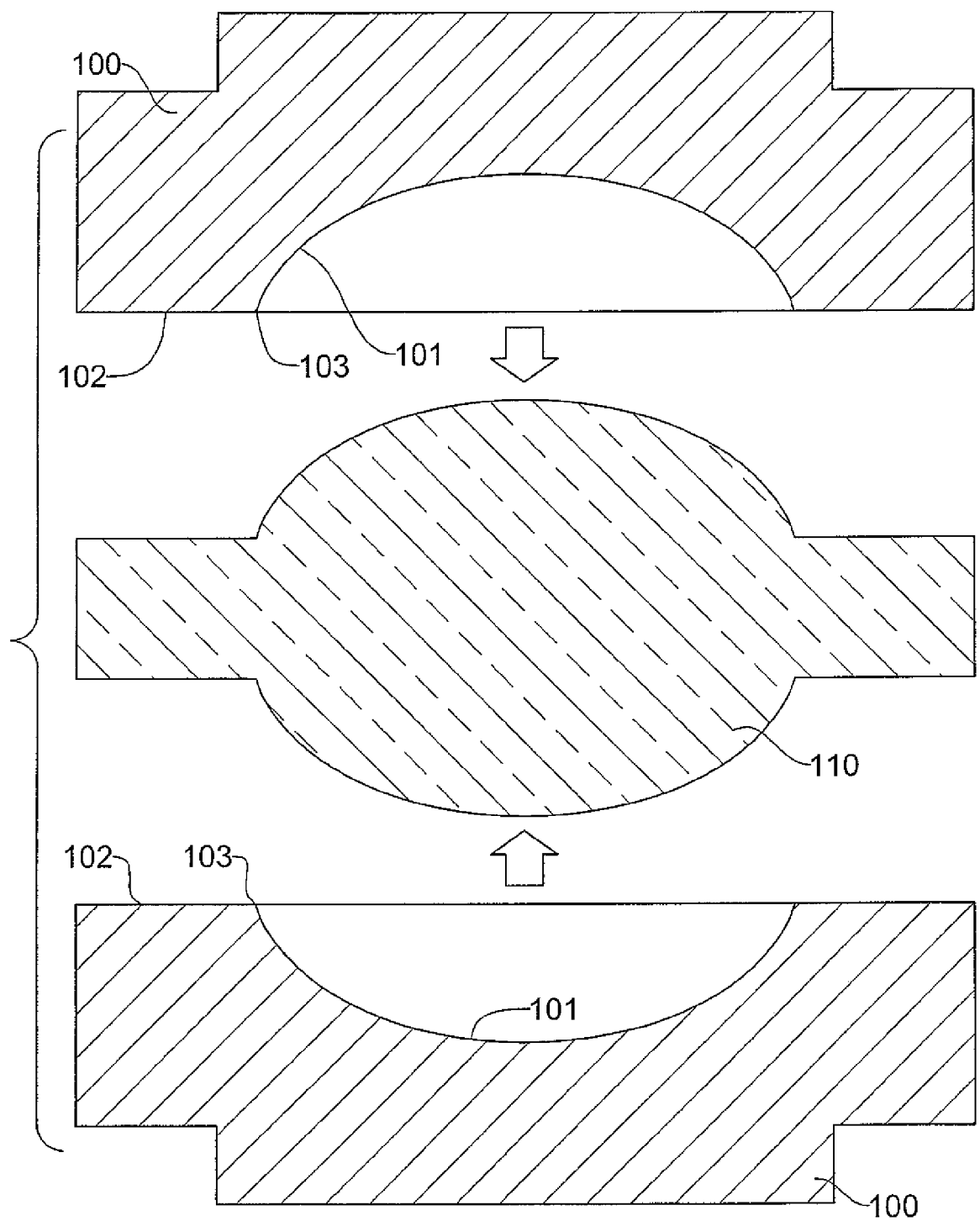
FIG. 1 is a cross sectional side view of a conventional mold and a conventional axially symmetrical molded glass lens in accordance with the prior art.
Figure 2A:
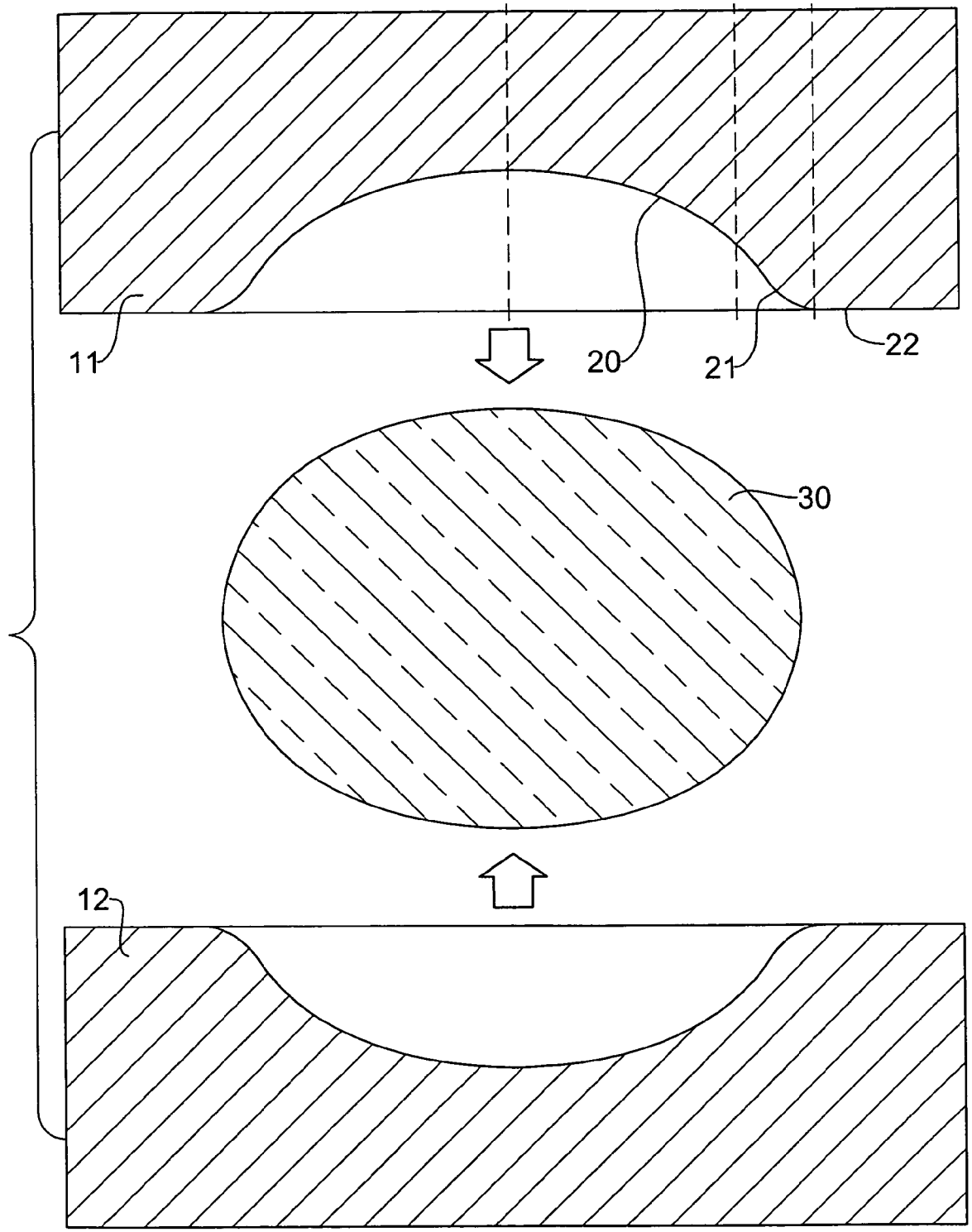
FIG. 2A is an operational cross sectional side view of a first embodiment of a mold assembly molding an axially symmetrical molded glass lens in accordance with the present invention.
Figure 2B:
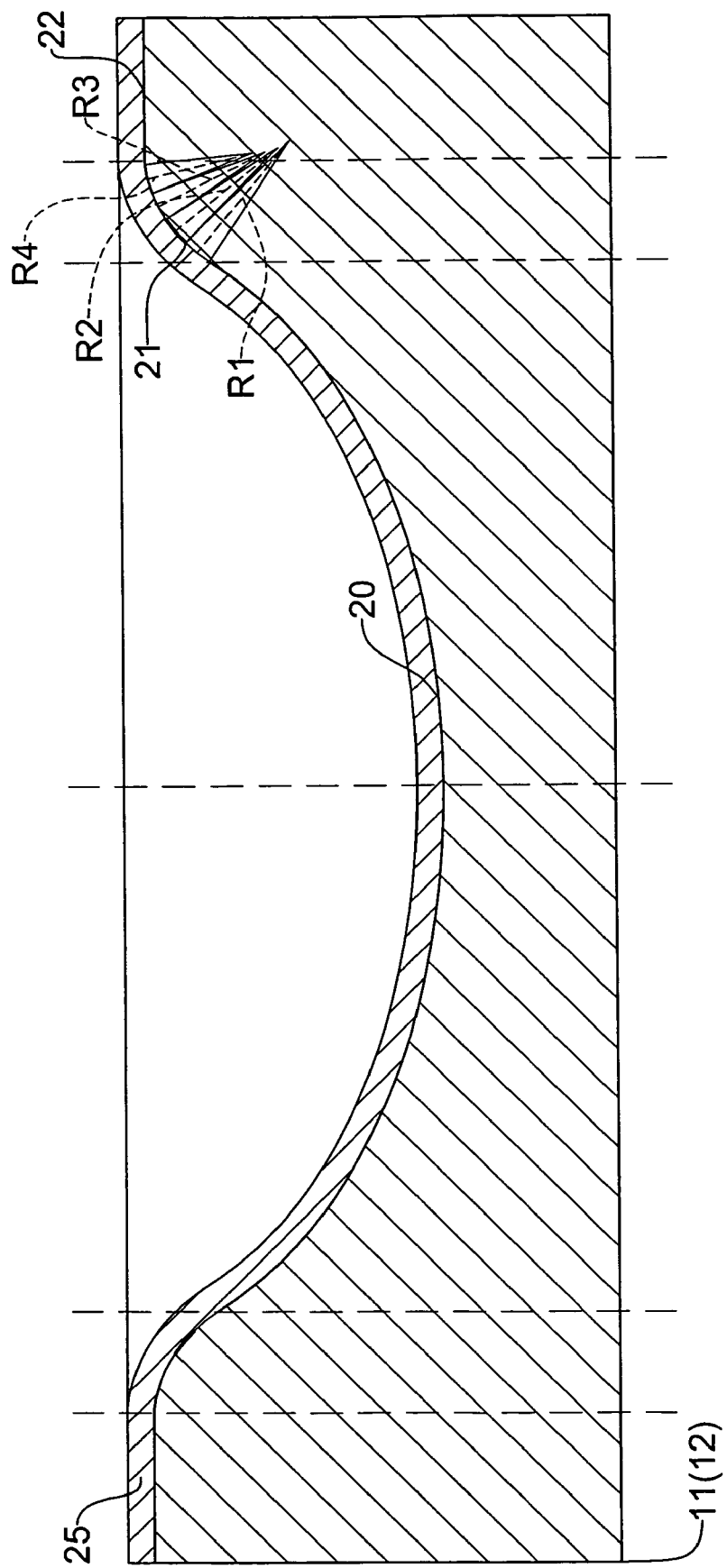
FIG. 2B is a cross sectional side view of one of the upper and lower molds of the mold assembly.
Figure 2C:
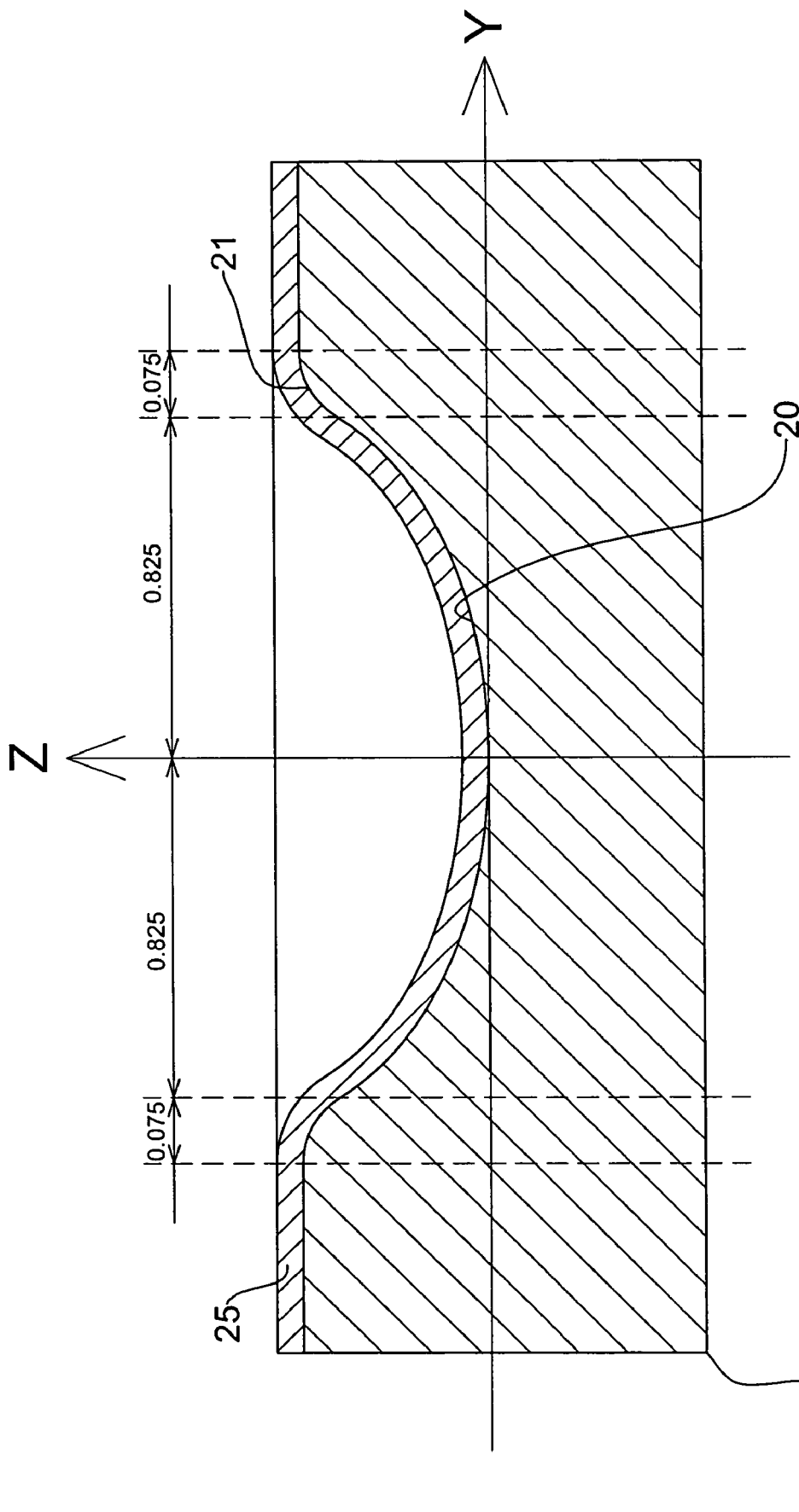
FIG. 2C is a cross sectional side view of one of the upper and lower molds of the mold assembly in FIG. 2B with a two-dimensional coordinate system.
Figure 2D:
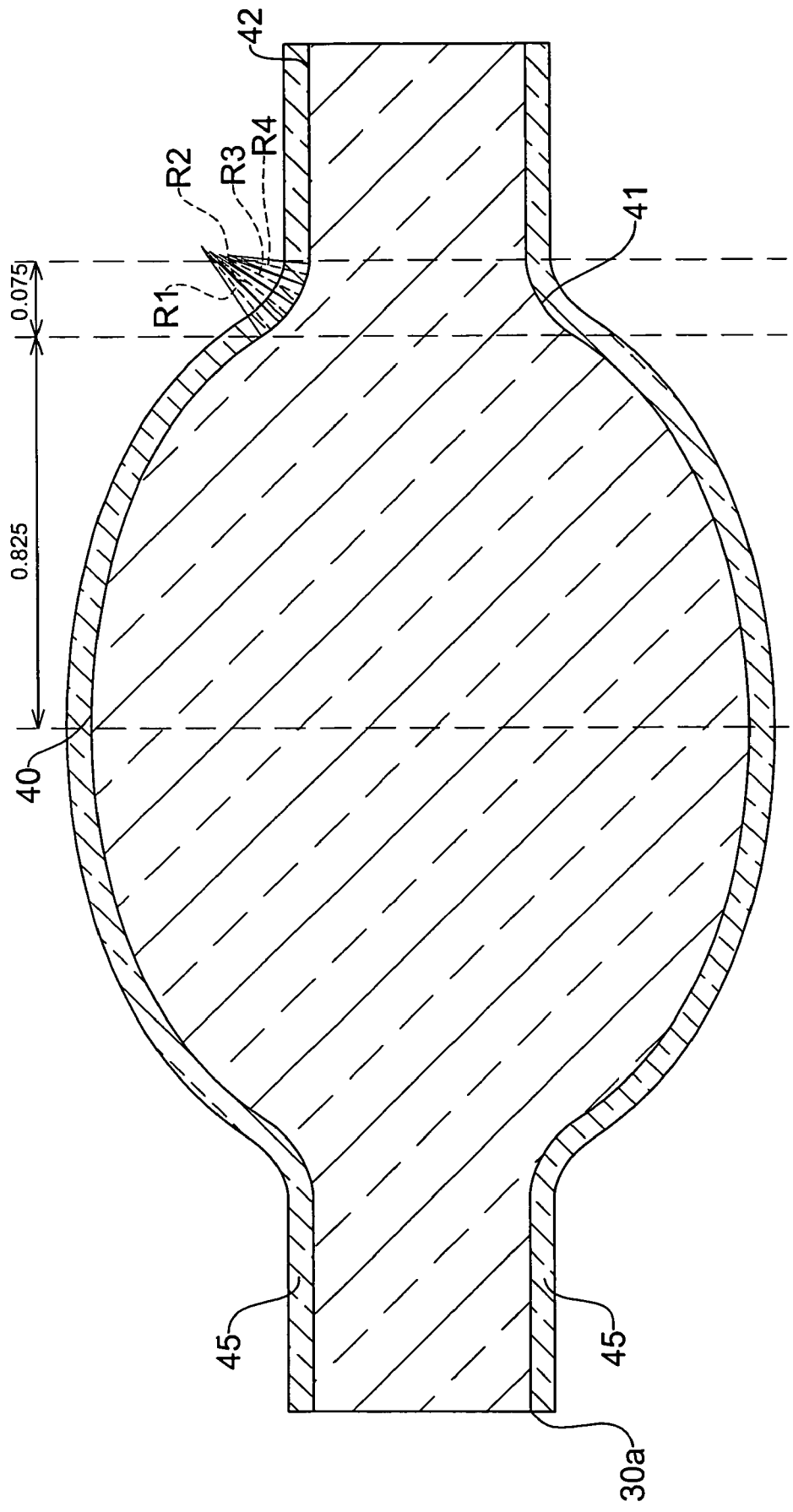
FIG. 2D is a cross sectional side view of a first embodiment of an axially symmetrical molded glass lens in accordance with the present invention formed with the mold assembly.
Figure 3A:
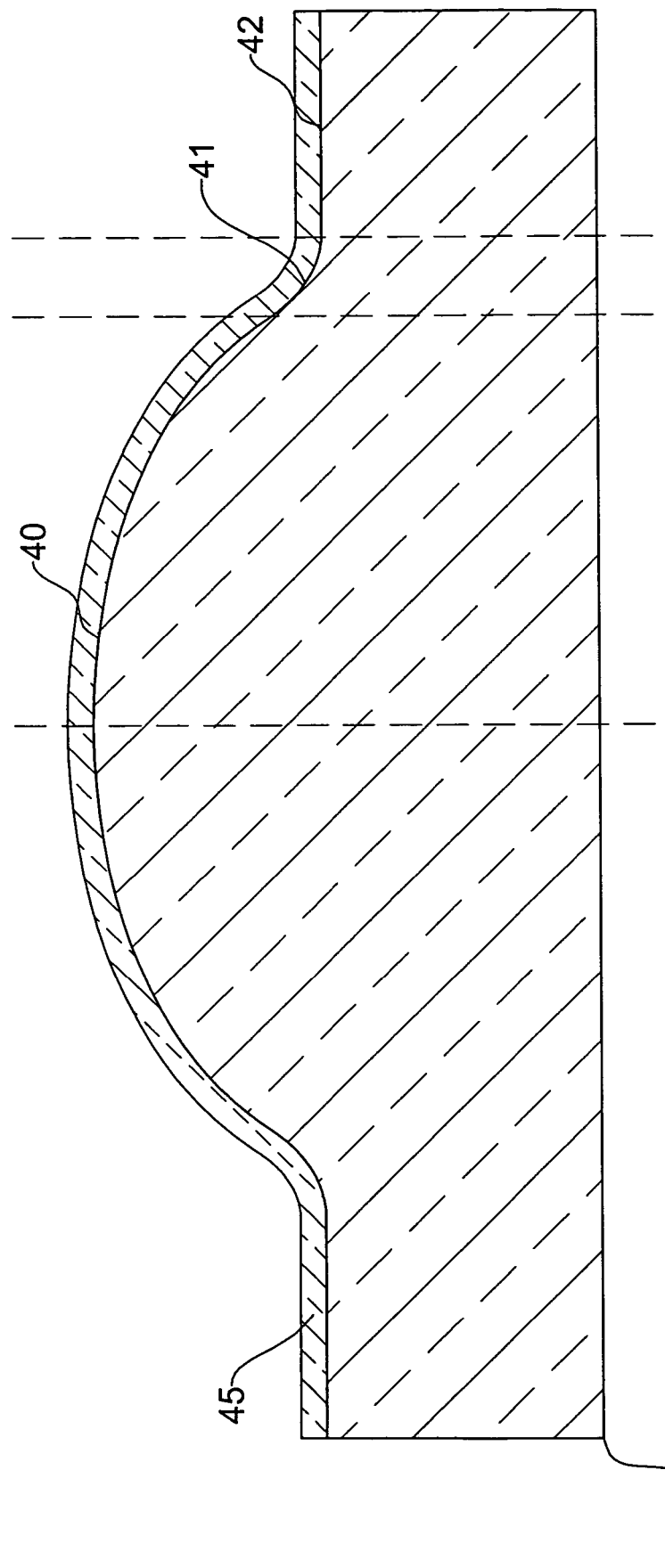
FIG. 3A is a cross sectional side view of a second embodiment of an axially symmetrical molded glass lens in accordance with the present invention.
Figure 3C:
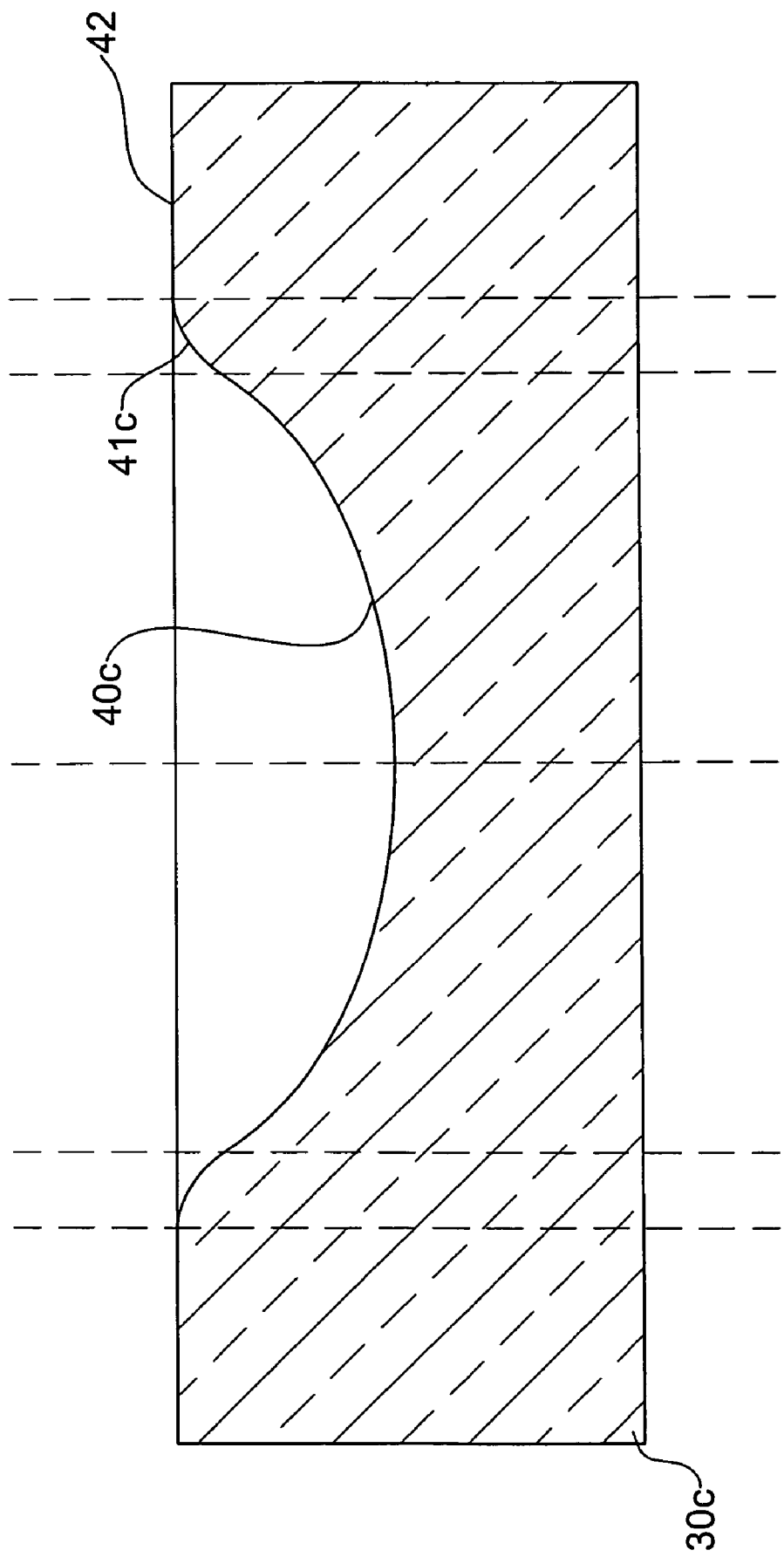
FIG. 3C is a cross sectional side view of an axially symmetrical molded glass lens in accordance with the present invention formed with the mold assembly in FIG. 3B.

With reference to FIGS. 2D, 3A and 3C, the axially symmetrical molded glass lens (30a, 30b, 30c) has a central longitudinal axis and comprises a lens surface (40, 40c), an annular intermediate area (41, 41c), a mounting flange area (42) and at least one optional optical coating (45).

The lens surface is circular and axially symmetric around the central longitudinal axis, is formed on the axially symmetrical molded glass lens, and is curved from the lens center toward the intermediate area.

The annular intermediate area (41, 41c) is curved and axially symmetric, is formed on the axially symmetrical molded glass lens (30a, 30b, 30c) and is formed concentrically around and connects continuously to the lens surface (40, 40c). The annular intermediate area (41, 41c) may be convex or concave. Therefore, curvature through the annular intermediate area (41, 41c) and the lens surface (40, 40c) is continuous. The annular intermediate area (41, 41c) has a radius of curvature (R1, R2, R3, R4) and a radial width. When the lens surface (40) is convex, the corresponding annular intermediate area (41) is concave, and when the lens surface (40c) is concave, the corresponding annular intermediate area (41c) is convex. Values of the radius of curvature of the annular intermediate area vary continuously to meet the requirements to smoothly and continuously connect the lens surface and the mounting flange area. An angle between the mounting flange area and the plane tangent to the intermediate area approaches to 0° as the plane moves from the lens surface toward the mounting flange area.

The mounting flange area is flat, is formed on the axially symmetrical molded glass lens, and is formed around and connects smoothly and continuously to the annular intermediate area.

An angle between the mounting flange area and the plane tangent to the intermediate area is less than 45° and approaches to 0° as the plane moves from the lens surface toward the mounting flange area.

The at least one optical coating (45) is formed on the lens surface (40, 40c), the annular intermediate area (41, 41c) and the mounting flange area (42) of the axially symmetrical molded glass lens (30a, 30b, 30c) and may be selected from a group of an ultraviolet filter, an infrared filter, a visible light attenuator, an anti-scratch coating or a combination thereof.

With reference to FIGS. 2A, 2B and 3B, the mold assembly for an axially symmetrical molded glass lens comprises an upper mold (11, 11a) and a lower mold (12).

The upper mold (11, 11a) may be made of material selected from a group comprising carbide, nitride and silicon and has a flat area (22), a lens transferring area (20, 20a), an intermediate area (21, 21a) and a protective coating (25).

The flat area (22) is annular and has an inner edge. The lens transferring area (20, 20a) is circular and axially symmetric, may be curved and convex or concave, is formed in or on the flat area of the upper mold (11, 11a) and has an outer edge.

The intermediate area (21, 21a) is annular, curved and axially symmetric, may be concave or convex, is formed concentrically on and connects smoothly to the lens transferring area (20) and has an inner edge, an outer edge, a radius of curvature (R1, R2, R3, R4) and a radial width. When the lens transferring area (20) is concave, the intermediate area (21) is convex. When the lens transferring area (20a) is convex, the intermediate area (21a) is concave. The inner edge of the intermediate area (21, 21a) connects smoothly and continuously to the outer edge of the lens transferring area (20, 20a). The outer edge of the intermediate area (21, 21a) connects smoothly to the inner edge of the flat area (22). The radius of curvature (R1, R2, R3, R4) has a modulus that continuously varies from the outer edge of the lens transferring area (20, 20a) to the inner edge of the flat area (22).

The protective coating (25) protects the upper mold (11, 11a), is deposited on the flat area (22), the intermediate area (21, 21a) and the lens transferring area (20, 20a) and is selected from a group comprising gold, platinum, iridium, osmium, rhenium, silver, palladium, rhodium, ruthenium, technetium and their or ceramic thereof, diamond-like carbon, and diamond.

The lower mold (12) may be made of material from a group comprising carbide, nitride and silicon sinter and has a flat area, a lens transferring area and a protective coating (25).

The lens transferring area is circular and may be flat or symmetric relative to the lens transferring area (20, 20a) of the upper mold (11, 11a).

The protective coating (25) protects the lower mold (12), is deposited on the flat area and the lens transferring area and is selected from a group comprising gold, platinum, iridium, osmium, rhenium, silver, palladium, rhodium, ruthenium, technetium, and their or ceramic thereof, diamond-like carbon and diamond.

A method for manufacturing the mold assembly in accordance with present invention comprises steps of cutting at least one mold (11, 11a, 12) and depositing a protective coating (25) on the mold (11, 11a, 12).

Figure 4:
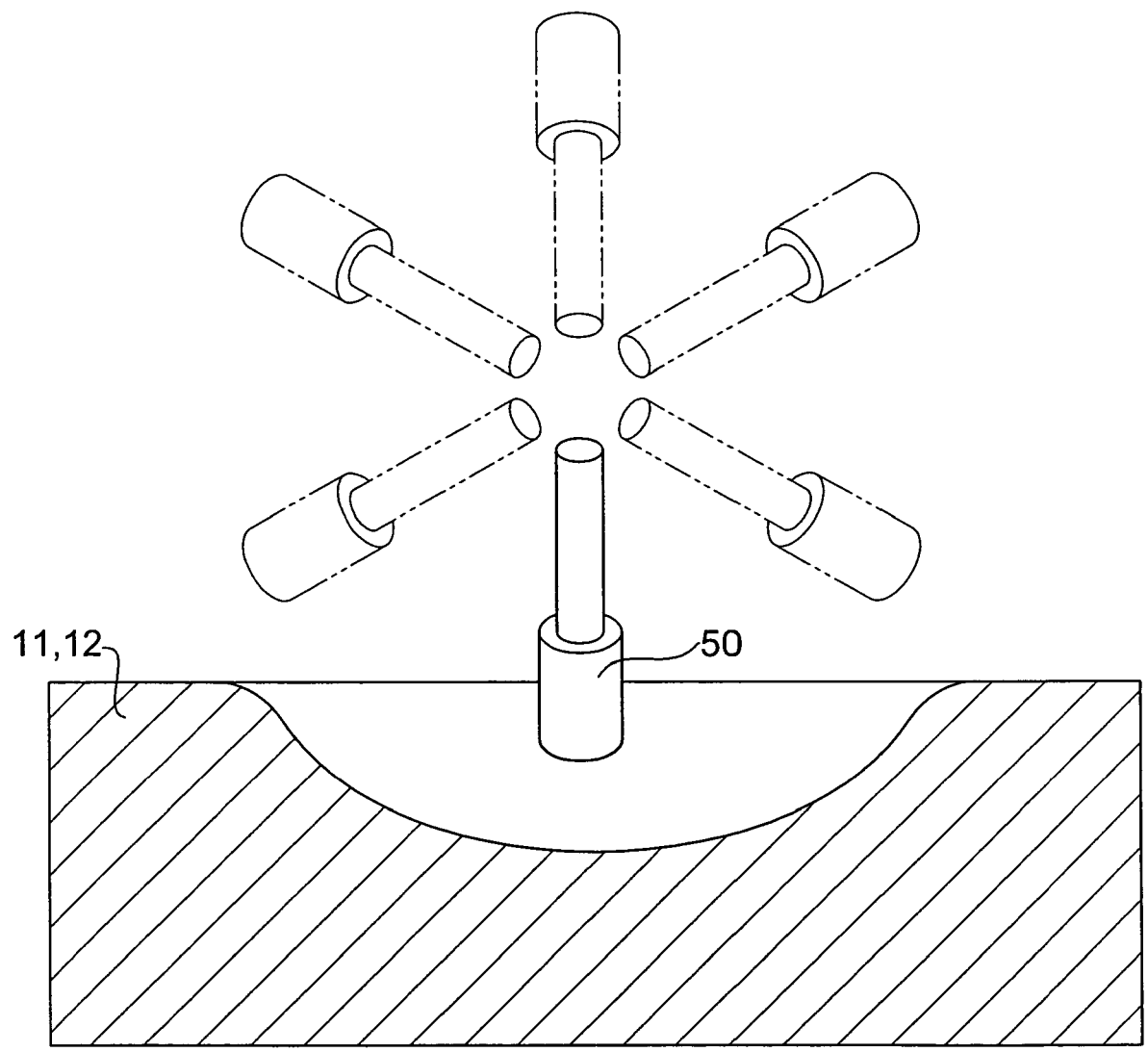
FIG. 4 is an operational front view of the cutter cutting the mold of the mold assembly in FIG. 2A.

With further reference to FIG. 4, the cutting step comprises cutting at least one mold (11, 11a, 12) to form a lens transferring area (20, 20a), an intermediate area (21, 21a) and a flat area (22) with a computer numerical control (CNC) lathe machine or grinder. The CNC lathe machine or grinder rotates a workpiece around an axis of rotation and has a cutter (50) and a computer. The cutter (50) is mounted movably at a position relative to the axis of rotation of the CNC lathe machine or grinder, cuts the mold (11, 11a, 12,) based on the position of the cutter (50) and may be a grinding wheel, a turning tool or a lathe tool. The computer has a cutting-path formula that controls the position of the cutter (50) to form the mold (11, 11a, 12) in a desired shape corresponding to an appropriate surface of the axially symmetrical molded glass lens.

With further reference to FIG. 2C, the cutting path formula positions the cutter (50) based on a two-dimensional coordinate system that is superimposed on the mold (11, 11a, 12) and has a Z-axis, a Y-axis and an origin. The Z-axis coincides with the axis of rotation of the CNC lathe machine or grinder, passes coaxially through the mold (11, 11a, 12) and provides a radial reference for the cutting path formula. The Y-axis intersects the Z-axis at a point, is perpendicular to the Z-axis and provides a longitudinal reference for the cutting path formula. The origin is located at the point where the Z-axis and the Y-axis intersect and is positioned on the lens transferring area (20, 20a). The cutting-path formula follows.

$$Z = \frac{CY^2}{1+\sqrt{1-(1+K)C^2Y^2}} + A_2Y^2 + A_4Y^4 + \ldots + A_{2n}Y^{2n}$$

where Z is a coordinate along the Z-axis, Y is a coordinate along the Y-axis and $A_2$, $A_4$, $A_{2n}$, C and K are constants and may be adjusted.

An example of radial and longitudinal coordinates and corresponding radius of curvature on the lens transferring area (20, 20a) and flat area (22) of a mold (11, 11a, 12,) for an axially symmetrical molded glass lens are provided in Tables 1 and 2.

TABLE 1

| Constant | Value |
| --- | --- |
| 1/C | 2.20878E+00 |
| K | 0.00000E+00 |
| $A_2$ | 0.00000E+00 |
| $A_4$ | −9.05511E−03 |
| $A_6$ | −2.70669E−02 |
| $A_8$ | 5.71773E−02 |
| $A_{10}$ | −9.75475E−02 |
| $A_{12}$ | 7.17599E−02 |
| $A_{14}$ | −2.20900E−02 |

Total Diameter of the Lens Transferring Area including the Intermediate Area: 1.8 mm

TABLE 2

| Coordinate Value | | Acute Angle between A Tangent Plane on The Intermediate Area and The Flat Area (degree) | Radius of Curvature (mm) |
| --- | --- | --- | --- |
| Y (mm) | Z (mm) | | |
| 0 | 0 | 0 | 2.2087800 |
| 0.1 | 0.0022639 | 2.5927268 | 2.2144480 |
| 0.2 | 0.0090573 | 5.1760034 | 2.2352162 |
| 0.3 | 0.0203782 | 7.7335547 | 2.2788288 |
| 0.4 | 0.0362067 | 10.242083 | 2.3524567 |
| 0.5 | 0.0564919 | 12.672234 | 2.4697087 |
| 0.6 | 0.0811275 | 14.975934 | 2.6792588 |
| 0.7 | 0.109881 | 17.053901 | 3.1358269 |
| 0.8 | 0.1546341 | 19.001006 | −1.137346 |
| 0.82 | 0.161273 | 17.60979 | −0.686092 |
| 0.84 | 0.167232 | 15.413024 | −0.441918 |
| 0.86 | 0.1721724 | 12.117336 | −0.295500 |
| 0.88 | 0.1756538 | 7.3358308 | −0.203584 |
| 0.9 | 0.1771081 | 0.6100025 | −0.146029 |
| 0.92 | 0.1771081 | 0 | ∞ |
| 0.94 | 0.1771081 | 0 | ∞ |

Values of the constants in Table 1 were determined by experimentation and allow the CNC lathe machine to cut the lens transferring area (20, 20a) and flat area (22) of a mold (11, 11a, 12) in a single, uninterrupted process. The diameter of the lens transferring area (20, 20a) extend from −0.825 millimeter (mm) to 0.825 mm along the Y-axis, the radius of curvature continuously varies, and the lens transferring area (20, 20a) is axially symmetric and curved. The radial width of the intermediate area (21, 21a) extends from 0.825 mm to 0.9 mm and from −0.825 mm to −0.9 mm on the Y-axis, the radius of curvature continuously varies, and the intermediate area (21, 21a) is axially symmetric and curved. With further reference to FIGS. 2B and 2D, the radius of curvature (R1, R2, R3, R4) at different points on the intermediate area (21, 21a) along a radial line are different. For example, points at Y-coordinates of 0.82 mm, 0.84 mm, 0.86 mm and 0.88 mm in Table 2 have radii of curvature respectively of −0.686092 mm, −0.441918 mm, −0.295500 mm and −0.203584 mm and show that the radii of curvature of the intermediate area (21, 21a) vary. An angle between the flat area (22) and a plane tangent to the intermediate area (21, 21a) is less than 45°. The angle between the flat area (22) and the plane tangent to the intermediate area (21, 21a) decreases as the plane moves from the outer edge of the lens transferring area (20, 20a) toward the inner edge of the flat area (22) and is nearly 0° at the inner edge of the flat area (22).

The depositing step comprises depositing a protective coating (25) on the lens transferring area (20, 20a), the intermediate area (21, 21a) and the flat area (22) on each mold (11, 11a, 12) using a deposition technique. The deposition technique is selected from a group of a physical phase deposition technique, a chemical phase deposition technique and an ion-sputtering technique.

A method for manufacturing the axially symmetrical molded glass lens in accordance with the present invention comprises steps of hot-pressing glass and depositing at least one optical coating (45).

The hot-pressing step comprises steps of obtaining a glass (30), heating the glass (30) until it is malleable, placing the heated glass (30) between molds (11, 11a, 12,) of a mold assembly, pressing the malleable glass (30) in the mold assembly to form an axially symmetrical molded glass lens, removing the axially symmetrical molded glass lens from the mold assembly and tempering the axially symmetrical molded glass lens.

In the heating glass (30) step, the glass (30) is heated to a temperature of 300° C. to 700° C. until the glass (30) is malleable.

The pressing malleable glass (30) in the mold assembly forms the lens surface (30a, 30b, 30c), the annular intermediate area (41, 41c) and the mounting flange area (42).

Tempering the axially symmetrical molded glass lens comprises heat-treating the axially symmetrical molded glass lens in an oven by gradually raising and lowering the temperature.

The depositing at least one optical coating (45) comprises depositing at least one optical coating (45) on the surfaces (40, 40c) and areas (41, 41c, 42) of the axially symmetrical molded glass lens (30a, 30b, 30c) by a deposition technique. The deposition technique is selected from a group of physical phase deposition, chemical phase deposition and an ion-sputtering.

The present invention has the following advantages.

The lens transferring area (20, 20a) smoothly connects to the intermediate area (21, 21a) of the mold (11, 11a, 12) and has no optical aberrations, because the heated glass is pressed rather than poured, turbulent flow between the lens transferring and intermediate areas (20, 20a, 21, 21a) is obviated and the production rate and the precision of the axially symmetrical molded glass lens increase.

The cutting-path formula with the constant value in Table 1 may be applied to simultaneously cut the lens transferring area (20, 20a) and the intermediate area (21, 21a) on the mold (11, 11a, 12) in a single step. Accordingly, a cutting-path correction may be applied simultaneously to the lens transferring area (20, 20a) and the intermediate area (21, 21a) and will not cause inconsistency between the surfaces (20, 20a, 21, 21a). Therefore, manufacturing and correction time of the mold (11, 11a, 12) is reduced and the precision and the production rate of the mold (11, 11a, 12) are improved.

Even though numerous characteristics and advantages of the present invention have been set forth in the foregoing description, together with details of the structure and function of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. An axially symmetrical molded glass lens comprising:
a central longitudinal axis;
a lens surface being circular and axially symmetrical around the central longitudinal axis, formed on the axially symmetrical molded glass lens, and being curved from a lens center;
an annular, axially symmetrical intermediate area extended from the lens surface and being a part of the lens surface; and
a mounting flange area being flat, formed on the axially symmetrical molded glass lens, and formed around and connecting smoothly and continuously with the annular intermediate area, with the annular intermediate area connecting smoothly and continuously to the lens surface and the mounting flange area;
wherein values of a radius of curvature of the intermediate area vary continuously to meet requirements to smoothly and continuously connect the lens surface to the mounting flange area.

2. The axially symmetrical molded glass lens as claimed in claim 1, wherein the lens surface has a shape selected from a convex shape, a concave shape, a flat shape or a hybrid shape from macro aspect.

3. The axially symmetrical molded glass lens as claimed in claim 2, wherein the intermediate area is convex shaped, concave shaped, flat shaped or hybrid shaped.

4. The axially symmetrical molded glass lens as claimed in claim 3, wherein an angle between the mounting flange area and a plane tangent to the intermediate area is less than 45° and approaches to 0° as the plane moves from the lens surface toward the mounting flange area.

5. The axially symmetrical molded glass lens as claimed in claim 1, wherein at least one optical coating is deposited on the lens surface, the intermediate area and the mounting flange area of the axially symmetrical molded glass lens.

6. The axially symmetrical molded glass lens as claimed in claim 5, wherein the at least one optical coating is selected to perform as an ultraviolet filter, an infrared filter, a visible light attenuator, and a light efficiency improving coating or a combination thereof.

7. A method for manufacturing an axially symmetric molded glass lens comprising hot-pressing glass by a mold assembly to form an axially symmetrical molded glass lens;
wherein the mold assembly has an upper mold and a lower mold, and at least one profile of the upper and lower molds has
an annular, axially symmetrical flat area; and
a circular, axially symmetrical lens transferring area; and
an annular, axially symmetrical intermediate area extended from the lens transferring area and being a part of the lens transferring area, and connecting smoothly and continuously to the lens transferring area and the flat area;
wherein the flat area, the lens transferring area and the intermediate area of the mold assembly are transferred to the glass respectively to form a mounting flange area, a lens surface and the annular intermediate area on the axial symmetric molded glass lens; and
wherein values of a radius of curvature of the annular intermediate area vary continuously to meet requirements to smoothly and continuously connect the lens transferring area to the flat area.

8. The method as claimed in claim 7, wherein the lens transferring area has a shape selected from a convex shape, a concave shape, a flat shape or a hybrid shape from macro aspect.

9. The method as claimed in claim 8, wherein the intermediate area is convex shaped, concave shaped, flat shaped or hybrid shaped according to requirements to smoothly and continuously connect the lens transferring area to the flat area.

10. The method as claimed in claim 9, wherein an angle between the mounting flange area and a plane tangent to the annular intermediate area is less than 45° and approaches to 0° as the plane moves from the lens surface towards the mounting flange area.

11. The method as claimed in claim 7 further comprising depositing at least one optical coating on the lens surface, the annular intermediate area and the mounting flange area on the axially symmetrical molded glass lens selected to perform as an ultraviolet filter, an infrared filter, a visible light attenuator, and a light efficiency improving coating or a combination thereof.

12. The method as claimed in claim 11, wherein the at least one optical coating is deposited with a technique selected from Physical Vapor Deposition technique, Chemical Vapor Deposition technique or sputtering technique.

* * * * *